(12) United States Patent
Flosbach

(10) Patent No.: US 8,785,588 B2
(45) Date of Patent: Jul. 22, 2014

(54) TIN-CONTAINING POLYURETHANE RESIN

(75) Inventor: Carmen Flosbach, Wuppertal (DE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 0 days.

(21) Appl. No.: 13/635,053

(22) PCT Filed: May 5, 2011

(86) PCT No.: PCT/US2011/035302
§ 371 (c)(1),
(2), (4) Date: Sep. 14, 2012

(87) PCT Pub. No.: WO2011/143038
PCT Pub. Date: Nov. 17, 2011

(65) Prior Publication Data
US 2013/0004672 A1     Jan. 3, 2013

Related U.S. Application Data

(60) Provisional application No. 61/332,955, filed on May 10, 2010.

(51) Int. Cl.
*C08G 18/83*      (2006.01)

(52) U.S. Cl.
USPC ............... 528/58; 528/44; 528/485; 524/589; 524/590; 524/591; 427/384; 427/385.5

(58) Field of Classification Search
None
See application file for complete search history.

(56) References Cited

U.S. PATENT DOCUMENTS

| | | | |
|---|---|---|---|
| 6,007,793 A | | 12/1999 | Bhatt et al. |
| 2002/0071811 A1 | * | 6/2002 | Bhatt et al. .................. 424/45 |
| 2008/0299323 A1 | * | 12/2008 | Flosbach et al. ............ 427/487 |
| 2009/0053421 A1 | * | 2/2009 | Flosbach et al. ............ 427/386 |

FOREIGN PATENT DOCUMENTS

WO     2007089643 A1     8/2007

OTHER PUBLICATIONS

ISA European Patent Office, International Search Report and Written Opinion for Application No. PCT/US2011/035302, mailed Aug. 12, 2011.

ISA European Patent Office, International Preliminary Report on Patentability for Application No. PCT/US2011/035302, mailed Nov. 22, 2012.

\* cited by examiner

*Primary Examiner* — Erma Cameron
(74) *Attorney, Agent, or Firm* — Ingrassia Fisher & Lorenz, P.C.

(57) ABSTRACT

A tin-containing polyurethane resin having a melting temperature of 40 to 180° C., measured by DSC at a heating rate of 10 K/min and prepared by carrying out a condensation reaction between a diorganotin compound and carboxyl groups of a carboxyl-functional polyurethane resin, wherein the molar ratio between the tin and the carboxyl groups is 1:2-20; and liquid coating compositions containing solid particles of the tin-containing polyurethane resin.

11 Claims, No Drawings

TIN-CONTAINING POLYURETHANE RESIN

CROSS-REFERENCE TO RELATED APPLICATIONS

This application is a 35 USC §371 National Stage of International Application No. PCT/US2011/035302, filed May 5, 2011, which claims the benefit of U.S. Provisional Application No. 61/332,955, filed May 10, 2010.

FIELD OF THE INVENTION

The invention relates to a solid tin-containing polyurethane resin. It relates also to a liquid coating composition which contains a crosslinkable binder, optionally, a crosslinker (curing agent, hardener) for the binder and solid particles of the tin-containing polyurethane resin.

DESCRIPTION OF THE PRIOR ART

WO 2007/089643 A1 discloses non-aqueous, liquid coating compositions which contain a carboxyl-functional resin which is present in the coating compositions as particles having a melting temperature of 40 to 180° C.

SUMMARY OF THE INVENTION

The invention is directed to a tin-containing polyurethane resin having a melting temperature of 40 to 180° C., in particular, 60 to 160° C., measured by DSC (differential scanning calorimetry) at a heating rate of 10 K/min and which can be prepared by carrying out a condensation reaction between a diorganotin compound and carboxyl groups of a carboxyl-functional polyurethane resin, wherein the molar ratio between the tin and the carboxyl groups is 1:2-20, wherein the diorganotin compound is selected from the group consisting of diorganotin oxides and diorganotin dialkanoates, and wherein the carboxyl-functional polyurethane resin is selected from the group consisting of polyurethane dicarboxylic acids and polyurethane monocarboxylic acids.

The invention is also directed to liquid coating compositions which contain a binder A and, as an optional component, a crosslinker B for the binder A, and solid particles of the tin-containing polyurethane resin.

DETAILED DESCRIPTION OF THE EMBODIMENTS

In the description and the claims the term "melting temperature measured by DSC at a heating rate of 10 K/min" is used. Said melting temperatures are not in general sharp melting points, but instead the upper end of melting ranges with a breadth of, for example, 30 to 150° C. To avoid misunderstandings, the term "upper end of a melting range" shall mean the end temperature $T_{SE}$ as defined in German Industry Standard DIN 53765 (issue March 1994). The melting ranges and thus, the melting temperatures are determined by DSC at heating rates of 10 K/min.

The tin-containing polyurethane resin of the present invention can be prepared by condensing a diorganotin compound with a carboxyl-functional polyurethane resin in a molar ratio of 1 mol tin:2-20 mols of carboxyl groups of the carboxyl-functional polyurethane resin, wherein the diorganotin compound is selected from the group consisting of diorganotin oxides and diorganotin dialkanoates and wherein the carboxyl-functional polyurethane resin is selected from the group consisting of polyurethane dicarboxylic acids and polyurethane monocarboxylic acids.

The diorganotin compound is selected from the group consisting of diorganotin oxides, in particular dialkyltin oxides like dibutyltin oxide and dioctyltin oxide, and diorganotin dialkanoates, in particular dialkyltin dialkanoates like dibutyltin diacetate and dibutyltin dilaurate.

The carboxyl-functional polyurethane resin is selected from the group consisting of polyurethane dicarboxylic acids and polyurethane monocarboxylic acids. It has a melting temperature of 40 to 180° C., in particular, 60 to 160° C., measured by DSC at a heating rate of 10 K/min. Typically, the carboxyl-functional polyurethane resin is only very slightly, if at all, soluble in organic solvents and/or in water. Its solubility can amount to, for example, less than 10, in particular less than 5 g per liter of butyl acetate or water at 20° C. The solubility can be determined by preparing a saturated solution of the carboxyl-functional polyurethane resin with a precipitate of the latter at 20° C., followed by filtering off and gravimetrically determining the non-dissolved portion of the carboxyl-functional polyurethane resin.

Methods for the production of such polyurethane dicarboxylic acids and such polyurethane monocarboxylic acids are known to the person skilled in the art.

Said polyurethane dicarboxylic acids may, for example, be produced by reacting diol(s) with diisocyanate(s) in excess and reacting the excess free isocyanate groups with one or more carboxylic acids with one group capable of addition with isocyanate, such as, for example, monoaminocarboxylic acids and in particular, monohydroxycarboxylic acids.

A further method for the production of said polyurethane dicarboxylic acids is, for example, to react diisocyanate(s) with diol(s) in excess and to react the excess hydroxyl groups with cyclic carboxylic anhydride.

Said polyurethane monocarboxylic acids may, for example, be produced by reacting diol(s) with diisocyanate(s) in excess and reacting 50% of the excess free isocyanate groups with one or more carboxylic acids with one group capable of addition with isocyanate, such as, for example, monoaminocarboxylic acids and in particular, monohydroxycarboxylic acids, and the other 50% of the excess free isocyanate groups with one or more monoalcohols.

Diols suitable for the production of the polyurethane mono- or dicarboxylic acids are not only diols in the form of low molar mass compounds defined by empirical and structural formula but also oligomeric or polymeric diols with number-average molar masses of, for example, up to 800, for example, corresponding polyetherdiols, polyesterdiols or polycarbonatediols; low molar mass diols defined by an empirical and structural formula are, however, preferred. The person skilled in the art selects the nature and proportion of the educts, i.e. the diisocyanates, the diols, the carboxylic acids with at least one group capable of addition with isocyanate, the monoalcohols and the cyclic carboxylic anhydrides in such a manner that polyurethane mono- or dicarboxylic acids with the above-mentioned melting temperatures and solubility properties are obtained.

The polyurethane mono- or dicarboxylic acids may be produced in the presence of a suitable organic solvent (mixture), which, however, makes it necessary to isolate the polyurethane mono- or dicarboxylic acids obtained in this manner or remove the solvent therefrom. Preferably, the production of the polyurethane mono- or dicarboxylic acids is, however, carried out without solvent and without subsequent purification operations.

Preferred variants of polyurethane dicarboxylic acids and the production thereof are described in greater detail below.

In a first preferred variant, the polyurethane dicarboxylic acids can be prepared by reacting 1,6-hexane diisocyanate with a diol component and with at least one carboxylic acid with one group capable of addition with isocyanate in the molar ratio x:(x−1): 2. In case of the polyurethane monocarboxylic acids, the 1,6-hexane diisocyanate can be reacted with the diol component, with the at least one carboxylic acid with one group capable of addition with isocyanate and with at least one monoalcohol in the molar ratio x:(x−1):1:1. x means any desired value from 2 to 6, preferably, from 2 to 4, and the diol component is one single diol, in particular, one single (cyclo)aliphatic diol with a molar mass in the range of 62 to 600, or a combination of diols, preferably two to four, in particular, two or three diols, wherein, in the case of a diol combination each of the diols preferably constitutes at least 10 mol % of the diols of the diol component. In the case of a diol combination, it is preferred, that at least 70 mol %, in particular, 100 mol % of the diols are (cyclo)aliphatic diols, each with a molar mass in the range of 62 to 600.

The term "(cyclo)aliphatic" used in the present description and the claims encompasses cycloaliphatic, linear aliphatic, branched aliphatic and cycloaliphatic with aliphatic residues. Diols differing from (cyclo)aliphatic diols accordingly comprise aromatic or araliphatic diols with aromatically and/or aliphatically attached hydroxyl groups. One example is bisphenol A. Diols differing from (cyclo)aliphatic diols may furthermore comprise oligomeric or polymeric diols with number-average molar masses of, for example, up to 800, for example, corresponding polyether, polyester or polycarbonate diols.

One single diol, in particular, one single (cyclo)aliphatic diol with a molar mass in the range of 62 to 600 is used as the diol component. It is also possible to use a combination of diols, preferably two to four, in particular, two or three diols, wherein each of the diols preferably constitutes at least 10 mol % of the diols of the diol component and wherein it is further preferred, that at least 70 mol %, in particular 100 mol % of the diols are (cyclo)aliphatic diols, each with a molar mass in the range of 62 to 600.

In the case of the diol combination, the diol component may be introduced as a mixture of its constituent diols or the diols constituting the diol component may be introduced individually into the synthesis. It is also possible to introduce a proportion of the diols as a mixture and to introduce the remaining proportion(s) in the form of pure diol.

Examples of diols which are possible as one single diol of the diol component are ethylene glycol, the isomeric propane- and butanediols, 1,5-pentanediol, 1,6-hexanediol, 1,10-decanediol, 1,12-dodecanediol, 1,4-cyclohexanedimethanol, hydrogenated bisphenol A and dimer fatty alcohol.

Examples of diols which are possible as constituent of the diol component are telechelic(meth)acrylic polymer diols, polyester diols, polyether diols, polycarbonate diols, each with a number-average molar mass of, for example, up to 800 as representatives of oligomeric or polymeric diols, bisphenol A as a representative of low molar mass non-(cyclo)aliphatic diols defined by empirical and structural formula and ethylene glycol, the isomeric propane- and butanediols, 1,5-pentanediol, 1,6-hexanediol, 1,10-decanediol, 1,12-dodecanediol, neopentyl glycol, butylethylpropanediol, the isomeric cyclohexanediols, the isomeric cyclohexanedimethanols, hydrogenated bisphenol A, tricyclodecanedimethanol, and dimer fatty alcohol as representatives of (cyclo)aliphatic diols defined by empirical and structural formula with a low molar mass in the range of 62 to 600.

Preferably, only one carboxylic acid with one group capable of addition with isocyanate is used. Examples of the at least one carboxylic acid with one group capable of addition with isocyanate are in particular monohydroxycarboxylic acids, such as, for example, glycolic acid (hydroxyacetic acid), malic acid, 12-hydroxystearic acid, 4-hydroxybenzoic acid or 1:1-adducts of monoepoxy compounds and dicarboxylic acids, for example, corresponding adducts of glycidyl ethers or glycidyl esters, such as, glycidyl versatate with dicarboxylic acids.

Preferably, only one monoalcohol is used. Examples of the at least one monoalcohol comprise (cyclo)aliphatic C1-C12 monoalcohols in particular.

1,6-hexane diisocyanate, the diol(s) of the diol component and the at least one carboxylic acid with one group capable of addition with isocyanate or, in case of the polyurethane monocarboxylic acid synthesis, 1,6-hexane diisocyanate, the diol(s) of the diol component, the at least one carboxylic acid with one group capable of addition with isocyanate and the at least one monoalcohol are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvent is complete and the reaction mixture has cooled, solid polyurethane di- or monocarboxylic acids are obtained. When low molar mass diols defined by empirical and structural formula are used for synthesis of the polyurethane dicarboxylic acids their molar masses calculated with the example of 12-hydroxystearic acid as the only monohydroxycarboxylic acid used are in the range of 998 or above, for example, up to 2500. When low molar mass diols defined by empirical and structural formula are used for synthesis of the polyurethane monocarboxylic acids their molar masses calculated with the example of dodecanol as the only monoalcohol used are in the range of 884 or above, for example, up to 2500.

In a second preferred variant, the polyurethane dicarboxylic acids can be prepared by reacting a diisocyanate component, a diol component and at least one carboxylic acid with one group capable of addition with isocyanate in the molar ratio x:(x−1): 2, wherein x means any desired value from 2 to 6, preferably, from 2 to 4, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluoylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from linear aliphatic alpha,omega-C2-C12-diols, wherein each diol of the diol component preferably forms at least 10 mol % within the diol component, and wherein the mol % of the respective diols add up to 100 mol %. In case of the polyurethane monocarboxylic acids, the diisocyanate component can be reacted with the diol component, with the at least one carboxylic acid with one group capable of addition with isocyanate and with at least one monoalcohol in the molar ratio $x:(x-1):1:1$.

50 to 80 mol % of the diisocyanate component is formed by 1,6-hexane diisocyanate, and 20 to 50 mol % by one or two diisocyanates selected from the group consisting of toluoylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein if two diisocyanates are selected, each diisocyanate forms at least 10 mol % of the diisocyanates of the diisocyanate component. Preferably, the diisocyanate or the two diisocyanates, forming in total 20 to 50 mol % of the diisocyanate component, are selected from dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

The diol component consists to an extent of 20 to 100 mol % of at least one linear aliphatic alpha,omega-C2-C12-diol and to an extent of 0 to 80 mol % of at least one diol differing from linear aliphatic alpha,omega-C2-C12-diols. The diol component preferably consists of no more than four different diols, in particular, only of one to three diols. In the case of only one diol, it accordingly comprises a linear aliphatic alpha,omega-C2-C12-diol. In the case of a combination of two, three or four diols, the diol component consists to an extent of 20 to 100 mol %, preferably of 80 to 100 mol %, of at least one linear aliphatic alpha,omega-C2-C12-diol and to an extent of 0 to 80 mol %, preferably of 0 to 20 mol % of at least one diol differing from linear aliphatic alpha,omega-C2-C12-diols and preferably, also from alpha,omega-diols with more than 12 carbon atoms. The at least one diol differing from linear aliphatic alpha,omega-C2-C12-diols and preferably, also from alpha,omega-diols with more than 12 carbon atoms comprises in particular (cyclo)aliphatic diols defined by empirical and structural formula and with a low molar mass in the range of 76 to 600. The proportion of possible non-(cyclo)aliphatic diols preferably amounts to no more than 30 mol % of the diols of the diol component. In the case of a diol combination, each diol preferably makes up at least 10 mol % of the diol component.

Preferably, the diol component does not comprise any non-(cyclo)aliphatic diols. Most preferably, it does not comprise any diols that are different from linear aliphatic alpha,omega-C2-C12-diols, but rather consists of one to four, preferably, one to three, and in particular, only one linear aliphatic alpha, omega-C2-C12-diol.

In the case of the diol combination, the diol component may be introduced as a mixture of its constituent diols or the diols constituting the diol component may be introduced individually into the synthesis. It is also possible to introduce a proportion of the diols as a mixture and to introduce the remaining proportion(s) in the form of pure diol.

Examples of linear aliphatic alpha,omega-C2-C12-diols that may be used as one single diol or as constituent of the diol component are ethylene glycol, 1,3-propanediol, 1,4-butanediol, 1,5-pentanediol, 1,6-hexanediol, 1,10-decanediol and 1,12-dodecanediol.

Examples of diols that are different from linear aliphatic alpha,omega-C2-C12-diols and may be used in the diol component are telechelic(meth)acrylic polymer diols, polyester diols, polyether diols, polycarbonate diols, each with a number-average molar mass of, for example, up to 800 as representatives of oligomeric or polymeric diols, bisphenol A as a representative of low molar mass non-(cyclo)aliphatic diols defined by empirical and structural formula and those isomers of propanediol and butanediol that are different from the isomers of propanediol and butanediol specified in the preceding paragraph, as well as, neopentyl glycol, butyl ethyl propanediol, the isomeric cyclohexanediols, the isomeric cyclohexanedimethanols, hydrogenated bisphenol A, tricyclodecanedimethanol, and dimer fatty alcohol as representatives of (cyclo)aliphatic diols defined by empirical and structural formula with a low molar mass in the range of 76 to 600.

Preferably, only one carboxylic acid with one group capable of addition with isocyanate is used. Examples of the at least one carboxylic acid with one group capable of addition with isocyanate are the same as those stated above as examples in the first preferred variant of the polyurethane mono- and dicarboxylic acids.

Preferably, only one monoalcohol is used. Examples of the at least one monoalcohol comprise (cyclo)aliphatic C1-C12 monoalcohols in particular.

The diisocyanates of the diisocyanate component, the diol (s) of the diol component and the at least one carboxylic acid with one group capable of addition with isocyanate or, in case of the polyurethane monocarboxylic acid synthesis, the diisocyanates of the diisocyanate component, the diol(s) of the diol component, the at least one carboxylic acid with one group capable of addition with isocyanate and the at least one monoalcohol are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvent is complete and the reaction mixture has cooled, solid polyurethane di- or monocarboxylic acids are obtained. When low molar mass diols defined by empirical and structural formula are used for synthesis of the polyurethane dicarboxylic acids their molar masses calculated with the example of 12-hydroxystearic acid as the only monohydroxycarboxylic acid used are in the range of 996 or above, for example, up to 2500. When low molar mass diols defined by empirical and structural formula are used for synthesis of the polyurethane monocarboxylic acids their molar masses calculated with the example of dodecanol as the only monoalcohol used are in the range of 882 or above, for example, up to 2500.

In a third preferred variant, the polyurethane dicarboxylic acids can be prepared by reacting 1,6-hexane diisocyanate with a diol component in the molar ratio $x:(x+1)$, wherein x means any desired value from 1 to 6, preferably, from 2 to 4, and the diol component is one single diol, in particular, one single (cyclo)aliphatic diol with a molar mass in the range of 62 to 600, or a combination of diols, preferably two to four, in particular two or three diols, wherein in the case of a diol combination each of the diols preferably constitutes at least 10 mol % of the diols of the diol component, and wherein the hydroxyl groups of the resultant polyurethane diols are then each reacted with one molecule of cyclic carboxylic anhydride and the anhydride is ring-opened.

In the case of a diol combination, it is preferred, that at least 70 mol %, in particular, 100 mol % of the diols are (cyclo) aliphatic diols, each with a molar mass in the range of 62 to 600.

With regard to the nature and use of the diol component and to the diols possible as constituents, in order to avoid repetition, reference is made to the statements made in relation to the first preferred variant of the polyurethane dicarboxylic acids.

1,6-hexane diisocyanate and the diol component are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. The diol component may, for example, be divided into two or more portions, for example, such that 1,6-hexane diisocyanate is initially reacted with part of the diol component before further reaction with the remaining proportion of the diol component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction, which is performed without solvent, is complete, the resultant polyurethane diols are reacted with one molecule of cyclic carboxylic anhydride per hydroxyl group.

Preferably, only one cyclic carboxylic anhydride is used. Examples of usable cyclic carboxylic anhydrides are maleic anhydride, succinic anhydride, tetrahydrophthalic anhydride, hexahydrophthalic anhydride, methylhexahydrophthalic anhydride, trimellitic anhydride and pyromellitic anhydride. During the reaction, the terminal hydroxyl groups of the polyurethane diols are esterified and the terminal carboxyl groups of the polyurethane dicarboxylic acids are formed. Addition of the cyclic carboxylic anhydride and the reaction generally proceed in the temperature range from 90 to 140° C., it being possible to monitor the course of the reaction by determining the acid value. The reaction is complete when the theoretical acid value is reached. Once the reaction carried out is complete and the reaction mixture has cooled, solid polyurethane dicarboxylic acids are obtained. When low molar mass diols defined by empirical and structural formula are used for synthesis of the polyurethane dicarboxylic acids, their molar masses calculated with the example of hexahydrophthalic acid anhydride as the only cyclic carboxylic acid anhydride used are in the range of 600 or above, for example, up to 2500.

In a fourth preferred variant, the polyurethane dicarboxylic acids can be prepared by reacting a diisocyanate component and a diol component in the molar ratio $x:(x+1)$, wherein x means any desired value from 1 to 6, preferably, from 2 to 4, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluoylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from linear aliphatic alpha,omega-C2-C12-diols, wherein each diol of the diol component preferably forms at least 10 mol % within the diol component, and wherein the mol % of the respective diols add up to 100 mol %, and wherein the hydroxyl groups of the resultant polyurethane diols are then each reacted with one molecule of a cyclic carboxylic anhydride.

With regard to the nature and use of the diisocyanate component, of the diol component and to the diols possible as constituents of the diol component, in order to avoid repetition, reference is made to the statements made in relation to the second preferred variant of the polyurethane mono- or dicarboxylic acids.

The diisocyanates of the diisocyanate component and the diol(s) of the diol component are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. The diol component may, for example, be divided into two or more portions or into individual diols, for example, such that the diisocyanates are initially reacted with part of the diol component before further reaction with the remaining proportion of the diol component. Equally, however, the diisocyanate component may also be divided into two or more portions or into the individual diisocyanates, for example, such that the hydroxyl components are initially reacted with part of the diisocyanate component and finally with the remaining proportion of the diisocyanate component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction, which is performed without solvent, is complete, the resultant polyurethane diols are reacted with cyclic carboxylic anhydride in a similar manner to that already described in the third preferred variant of the polyurethane dicarboxylic acids. Preferably, only one cyclic carboxylic anhydride is used. Examples of usable cyclic carboxylic anhydrides which may be mentioned are the same as those stated in the third preferred variant of the polyurethane dicarboxylic acids. Once the reaction carried out is complete and the reaction mixture has cooled, solid polyurethane dicarboxylic acids are obtained. When low molar mass diols defined by empirical and structural formula are used for synthesis of the polyurethane dicarboxylic acids, their molar masses calculated with the example of hexahydrophthalic acid anhydride as the only cyclic carboxylic acid anhydride used are in the range of 598 or above, for example, up to 2500.

The preferred variants of the polyurethane dicarboxylic acids and the first and second preferred variant of the polyurethane monocarboxylic acids explained above assume the form of a mixture exhibiting a molar mass distribution. They do not, however, require working up.

As already mentioned, the diorganotin compound and the carboxyl-functional polyurethane resin are subject to a condensation reaction, wherein the molar ratio between the tin and the carboxyl groups of the carboxyl-functional polyurethane resin is 1:2-20. The condensation may be carried out by the conventional methods known to the skilled person, for example, at elevated temperatures of, for example, 100 to 160° C., in the melt of the carboxyl-functional polyurethane resin. In case of a diorganotin oxide as diorganotin compound, water is formed by reaction of two carboxyl groups of the carboxyl-functional polyurethane resin and the oxygen of the diorganotin oxide; the water may be removed by distilling it off with or without the help of an entrainer like, for example, xylene. In case of a diorganotin dialkanoate as diorganotin compound, two carboxyl groups of the carboxyl-functional polyurethane resin react with one molecule of diorganotin dialkanoate and in the course of the reaction two molecules of the corresponding alkanoic acid are split off. After the end of the condensation reaction, the tin-containing polyurethane resin so formed is cooled and allowed to solidify. The solidified tin-containing polyurethane resin can be comminuted to form solid particles.

To avoid misunderstandings, the tin-containing polyurethane resin as the solidified end product of the condensation reaction between the diorganotin compound and the carboxyl-functional polyurethane resin does not necessarily consist only of the polymeric condensation product containing covalently bonded diorganotin moieties. Therefore the term "tin-containing polyurethane resin" used in the present description and the claims shall not be interpreted that narrow. Rather, the tin-containing polyurethane resin obtained as the end product of said condensation reaction can comprise some unreacted (excess) carboxyl-functional polyurethane resin and/or, in case the condensation reaction has been carried out with diorganotin dialkanoates, alkanoic acid which has been split off in the course of the condensation reaction. Dependent on the selected molar ratio between the tin and the carboxyl groups of the carboxyl-functional polyurethane resin it is also possible that the polymeric condensation product still contains carboxyl groups. The tin content of the tin-containing polyurethane resin, calculated as elemental tin metal, lies in the range of, for example, 0.5 to 8 wt. %.

As already mentioned, the tin-containing polyurethane resin has a melting temperature of 40 to 180° C., in particular, 60 to 160° C., measured by DSC at a heating rate of 10 K/min. It is insoluble or virtually insoluble in organic solvents and/or in water. It is only very slightly, if at all, soluble in organic solvents and/or in water. Its solubility can amount to, for example, less than 10, in particular less than 5 g per liter of butyl acetate or water at 20° C. The solubility can be determined by preparing a saturated solution of the tin-containing polyurethane resin with a precipitate of the latter at 20° C., followed by filtering off and gravimetrically determining the non-dissolved portion of the tin-containing polyurethane resin.

The tin-containing polyurethane resin can be used as a catalyst in liquid coating compositions. The invention is therefore also directed to liquid coating compositions which contain a binder A and, as an optional component, a crosslinker B for the binder A, and, as catalyst, solid particles of the tin-containing polyurethane resin.

The liquid coating compositions of the present invention are aqueous or non-aqueous coating compositions. Their solids content consists of the resin solids content, the solid particles of the tin-containing polyurethane resin used as catalyst, and the following optional components: pigments, fillers (extenders) and further non-volatile additives. The tin-containing polyurethane resin catalyst is not counted as part of the resin solids; rather, it is counted as non-volatile additive.

The resin solids (the solids contribution of the resin system) of the coating compositions comprises binder solids comprising at least the binder A and, optionally, crosslinker solids comprising at least the crosslinker B. If the resin solids comprise not only binder solids but also crosslinker solids, their weight ratio is, for example, 50 to 90 wt.-% of binder solids:10 to 50 wt.-% of crosslinker solids, wherein the sum of the wt.-% totals 100 wt.-%. The binder solids may consist of the binder A. The crosslinker solids may consist of the crosslinker B. The binder A may be a self-crosslinkable binder or an externally crosslinkable binder (binder which needs an external crosslinker for crosslinking). In case of a self-crosslinkable binder A the coating compositions may contain a crosslinker B, whereas in case of an externally crosslinkable binder A the coating compositions contain a crosslinker B.

Both, the binder A and the optionally contained crosslinker B are not present as solid particles in the liquid coating compositions of the present invention.

Generally, the binder A is not a solid at room temperature, but, for example, a liquid material. It may be soluble in an organic solvent (mixture) and/or it is dilutable with water or a water/organic solvent mixture, for example, soluble or dispersible therein. Binders A soluble in an organic solvent (mixture) are present in dissolved form in non-aqueous coating compositions according to the invention which contain organic solvent(s). Water-dilutable binders A are present in dissolved or dispersed, for example, emulsified form in aqueous coating compositions according to the invention which optionally also contain organic solvent(s).

Generally, the crosslinker B is not a solid at room temperature, but, for example, a liquid material. It may be soluble in an organic solvent (mixture) and/or it is dilutable with water or a water/organic solvent mixture, for example, soluble or dispersible therein. Crosslinkers B soluble in an organic solvent (mixture) are present in dissolved form in non-aqueous coating compositions according to the invention which contain organic solvent(s). Water-dilutable crosslinkers B are present in dissolved or dispersed, for example, emulsified form in aqueous coating compositions according to the invention which optionally also contain organic solvent(s).

Water-dilutable binders A and water-dilutable crosslinkers B may obtain their water-dilutability by addition of external emulsifiers or they are water-dilutable because of an appropriate content of conventional hydrophilic groups. Examples of these are nonionic hydrophilic groups, such as polyethylene oxide units, and/or ionic groups or groups convertible into ionic groups. Such binders A and crosslinkers B may be converted into the aqueous phase by addition of water or by addition of neutralizing agent and water. The ionic groups or groups convertible into ionic groups comprise in particular anionic groups or groups convertible into anionic groups, such as carboxyl groups in an amount corresponding to an acid value of, for example, 10 to 50 mg of KOH per gram of binder A or of crosslinker B. Binders A and crosslinkers B containing carboxyl groups may, for example, be converted into the aqueous phase by mixing with water once their carboxyl groups have been neutralized with bases, such as ammonia, amines or aminoalcohols.

The binder A may be selected from various types of binder resins including, for example, polysiloxane, polyurethane, polyester and vinyl copolymer like, for example, (meth) acrylic copolymer resins.

The coating compositions of the present invention are coating compositions curable under organotin catalysis. In an embodiment, such coating compositions comprise self-crosslinkable binders A curable by an organotin-catalyzed crosslinking reaction of appropriate functional groups. In another embodiment, they comprise a resin system comprising an externally crosslinkable binder A and a crosslinker B for the binder A, wherein the resin system is curable by an organotin-catalyzed crosslinking reaction between the functional groups of the externally crosslinkable binder A and the functional groups of the crosslinker B reactive with the functional groups of the binder A.

Examples of self-crosslinkable binders A curable by organotin-catalyzed self-condensation are those binders having hydroxyl groups and blocked isocyanate groups.

An example of a coating composition according to the invention being crosslinkable under organotin catalysis and containing an externally crosslinkable binder A and a crosslinker B for the binder A is distinguished by containing a combination of a hydroxyl-functional binder A with a free or blocked polyisocyanate crosslinker B.

The hydroxyl-functional binders A comprise conventional hydroxyl-functional binders known to the person skilled in the art and are readily available commercially or may be prepared by conventional synthesis procedures. Examples are polyester resins, polyurethane resins and vinyl copolymer resins like (meth)acrylic copolymer resins, in each case with hydroxyl values of, for example, 60 to 300 mg of KOH/g and number-average molar masses of, for example, 500 to 10000.

All number-average molar mass data stated in the present description and the claims are number-average molar masses determined or to be determined by gel permeation chromatography (GPC; divinylbenzene-crosslinked polystyrene as the immobile phase, tetrahydrofuran as the liquid phase, polystyrene standards).

Free polyisocyanate crosslinkers are readily available commercially and are also well-known to the person skilled in the art of paint and coatings. Free polyisocyanates are widely used as crosslinkers in the field of two-component paint and coatings. Examples of free polyisocyanates include diisocyanates and polyisocyanates having on average more than two free isocyanate groups per molecule. Examples of diisocyanates include hexamethylene diisocyanate, tetramethylxylylene diisocyanate, isophorone diisocyanate, dicyclohexylmethane diisocyanate, cyclohexane diisocyanate, toluoylene diisocyanate and diphenylmethane diisocyanate. Examples of polyisocyanates having on average more than two free isocyanate groups per molecule are those which contain heteroatoms in the residue linking the isocyanate groups. Examples of these are polyisocyanates which contain carbodiimide groups, allophanate groups, isocyanurate groups, uretidione groups, urethane groups, acylated urea groups or biuret groups, for example, polyisocyanates of the uretidione or isocyanurate type produced by di- or trimerization of the above-mentioned diisocyanates. Further examples are polyisocyanates produced by reaction of the above-mentioned diisocyanates with water and containing biuret groups or polyisocyanates produced by reaction with polyols and containing urethane groups. Particular examples are "coating polyisocyanates" based on hexamethylene diisocyanate, isophorone diisocyanate or dicyclohexylmethane diisocyanate; "coating polyisocyanates" based on these diisocyanates means the per se known biuret, urethane, uretidione and/or isocyanurate group-containing derivatives of these diisocyanates.

Examples of blocking agents which may be used to block the isocyanate groups of free isocyanate crosslinkers are well-known to the skilled person and they include alcohols, ketoximes like butanone oxime, phenols, and NH-group containing amines and nitrogen heterocycles like ε-caprolactame and pyrazole derivatives.

As already mentioned, the coating compositions of the present invention contain solid particles of the tin-containing polyurethane resin as catalyst. Said solid particles behave like a latent cure catalyst, since the tin-containing polyurethane resin, as long as not melted, is not or virtually not able to display its catalytic effect on the crosslinking reaction of the resin system of the coating compositions of the present invention.

The solid particles of the tin-containing polyurethane resin are insoluble or virtually insoluble in the coating compositions of the present invention.

The solid particles of the tin-containing polyurethane resin have, in particular, a non-spherical shape. The average particle size (mean particle diameter) determined by means of laser diffraction is, for example, 1 to 100 µm. The particles may be formed by grinding (milling) of the solid tin-containing polyurethane resin; for example, conventional powder coat production technology may be used for that purpose.

The solid particles of the tin-containing polyurethane resin are contained in the coating composition in an amount that is effective in catalyzing the crosslinking mechanism of the coating composition under the conditions of thermal cure, or to be more precise, in catalyzing (i) the self-crosslinking reaction of a self-crosslinkable binder A or (ii) the self-crosslinking reaction of a self-crosslinkable binder A and, simultaneously, the additional crosslinking reaction between the self-crosslinkable binder A and a crosslinker B or (iii) the crosslinking reaction between an externally crosslinkable binder A and a crosslinker B, in each case under the curing conditions. The solid particles of the tin-containing polyurethane resin are contained in the coating composition in a proportion of, for example, 0.5 to 10 wt.-%, relative to the resin solids of the coating composition; the skilled person will select the proportion of the solid particles of the tin-containing polyurethane resin within said range dependent on the polyurethane resin particles' tin content and the reactivity of the coating's crosslinking system.

The tin-containing polyurethane resin or the solid particles of the tin-containing polyurethane resin do not or virtually not (only marginally) catalyze said crosslinking reactions under storage and application conditions of the coating composition of the present invention. In other words, the tin-containing polyurethane resin behaves essentially passive as long as the temperature is not raised to or above its melting temperature. In still other words, as long as the tin-containing polyurethane resin is not melted, it does not or virtually not display its catalytic activity.

In case of non-aqueous coating compositions, the solid particles of the tin-containing polyurethane resin may be combined in any suitable manner, for example, either by stirring or mixing as a ground powder, into the liquid coating compositions or into liquid constituents thereof, wherein it is possible subsequently to perform additional wet grinding or dispersing of the particles. The subsequent grinding or dispersing may be done, for example, by means of a bead mill, in the resultant suspension. In case of aqueous coating compositions, the particles of the tin-containing polyurethane resin are, in particular, present within the generally aqueously dispersed binder A phase or binder A containing phase respectively. Here it is preferred to stir or mix the solid particles of the tin-containing polyurethane resin as a ground powder into the water-dilutable binder A not yet converted into the aqueous phase, wherein it is possible subsequently to perform additional wet grinding or dispersing of the particles, for example, by means of a bead mill, in the resultant suspension which thereafter is converted into the aqueous phase by dilution with water.

The coating compositions of the present invention contain water and/or organic solvent(s) and they have a solids content of, for example, 35 to 75 wt.-%, preferably of 40 to 65 wt.-%. In case of non-aqueous coating compositions the organic solvent content is, for example, 25 to 65 wt.-%, preferably, 35 to 60 wt.-%; the sum of the wt.-% of the solids content and the organic solvent content is here, for example, 90 to 100 wt.-% (any possible difference in the corresponding range of above 0 to 10 wt.-% to make up to the total of 100 wt.-% is in general formed by volatile additives). In case of aqueous coating compositions the organic solvent content is, for example, 0 to 20 wt.-%. The organic solvents are in particular conventional coating solvents, for example, glycol ethers, such as, butyl glycol, butyl diglycol, dipropylene glycol dimethyl ether, dipropylene glycol monomethyl ether, ethylene glycol dimethylether; glycol ether esters, such as, ethyl glycol acetate, butyl glycol acetate, butyl diglycol acetate, methoxypropyl acetate; esters, such as, butyl acetate, isobutyl acetate, amyl acetate; ketones, such as, methyl ethyl ketone, methyl isobutyl ketone, diisobutyl ketone, cyclohexanone, isophorone; alcohols, such as, methanol, ethanol, (iso)propanol, butanol; N-alkyl pyrrolidones, such as, N-methylpyrrolidone; aromatic hydrocarbons, such as, xylene, Solvesso® 100 (mixture of aromatic hydrocarbons with a boiling range from 155° C. to 185° C.), Solvesso® 150 (mixture of aromatic hydrocarbons with a boiling range from 182° C. to 202° C.) and aliphatic hydrocarbons.

Apart from the solid particles of the tin-containing polyurethane resin which are counted as non-volatile additive, the coating compositions may contain further conventional coating additives, for example, emulsifiers, neutralizing agents, levelling agents, wetting agents, anticratering agents, antioxidants and/or light stabilizers. The additives are used in conventional amounts known to the person skilled in the art.

The coating compositions may also contain transparent pigments, color-imparting and/or special effect-imparting pigments and/or fillers, for example, corresponding to a ratio by weight of pigment plus filler:resin solids content in the range from 0:1 to 2:1. Suitable color-imparting pigments are any conventional coating pigments of an organic or inorganic nature. Examples of inorganic or organic color-imparting pigments are titanium dioxide, iron oxide pigments, carbon black, azo pigments, phthalocyanine pigments, quinacridone pigments and pyrrolopyrrole pigments. Examples of special effect pigments are metal pigments, for example, of aluminum, copper or other metals, interference pigments, such as, for example, metal oxide-coated metal pigments, for example, iron oxide-coated aluminum, coated mica, such as, for example, titanium dioxide-coated mica, graphite effect-imparting pigments, iron oxide in flake form, liquid crystal pigments, coated aluminum oxide pigments, and coated silicon dioxide pigments. Examples of fillers are silicon dioxide, aluminum silicate, barium sulfate, calcium carbonate and talc.

The coating compositions according to the invention containing the solid particles of the tin-containing polyurethane resin catalyst are distinguished by an unimpaired storage stability (one component coating compositions) or an unimpaired pot life (multi-component coating compositions) compared to similar coating compositions which do not contain said particles. In other words, the presence of the solid particles of the tin-containing polyurethane resin does not significantly or negatively influence storage stability or pot life of the coating compositions. Pot life is the time within which, once the mutually reactive components of a coating composition have been mixed, the coating composition may still be properly processed or applied and coatings of unimpaired quality can be achieved.

The coating compositions may be used for the production of single-layer coatings or for the production of one or more coating layers within a multilayer coating, such as, in particular, an automotive multilayer coating, either on an automotive body or on an automotive body part. This may relate to both original and repair coating applications.

Thus, the present invention also relates to a process for the production of a coating layer on a substrate, comprising the steps:
1) applying a coating layer from a coating composition of the present invention on a substrate, and
2) thermally curing the coating layer at an object temperature at or above the melting temperature of the tin-containing polyurethane resin.

The coating composition may be applied by means of conventional application methods, in particular, by spraying onto any desired uncoated or precoated substrates, for example, of metal or plastics.

In step 2) of the process of the present invention the coating layer applied in step 1) is thermally cured (i) by the organotin-catalyzed self-crosslinking reaction of the self-crosslinkable binder A or (ii) by the organotin-catalyzed self-crosslinking reaction of the self-crosslinkable binder A and, simultaneously, the also organotin-catalyzed additional crosslinking reaction between the self-crosslinkable binder A and the crosslinker B or (iii) the organotin-catalyzed crosslinking reaction between the externally crosslinkable binder A and the crosslinker B. Thermal curing proceeds at object temperatures at or above the melting temperature of the tin-containing polyurethane resin catalyst, for example, at >40 to 200° C., preferably, >60 to 180° C., for example, by baking. Under said thermal curing conditions the tin-containing polyurethane resin catalyst displays its catalytic activity in terms of accelerating the crosslinking reaction compared to working with the uncatalyzed coating composition. By using the solid particles of the tin-containing polyurethane resin in the coating composition it is also possible to reduce the required object temperature during bake curing, provided that the object temperature lies at or above the melting temperature of the tin-containing polyurethane resin.

EXAMPLES

Examples 1a to 1c

Preparation of Polyurethane Dicarboxylic Acids

Polyurethane dicarboxylic acids were produced by reacting HDI (1,6-hexane diisocyanate) with a mixture of HSA (12-hydroxystearic acid) and a diol in accordance with the following general synthesis method:

The HSA was initially introduced into a 2 liter four-necked flask equipped with a stirrer, thermometer and column and 0.01 wt. % DBTL (dibutyltin dilaurate), relative to the amount of HSA, were added. The mixture was heated to 80° C. The diol was added and mixed for 15 min. HDI was then apportioned and a temperature was maintained so that the hot reaction mixture did not solidify. The reaction mixture was stirred until no free isocyanate could be detected (NCO content <0.1%).

Examples 1d to 1e

Preparation of Polyurethane Dicarboxylic Acids

Polyurethane dicarboxylic acids were produced by reacting HDI or a mixture of HDI and DCMDI (dicyclohexylmethane diisocyanate) with one or more diols and the resultant polyurethane diols were then in a second step reacted with the stoichiometric amount of an acid anhydride (one mol of acid anhydride per mol OH) in accordance with the following general synthesis method:

One diol or a mixture of diols was initially introduced into a 2 liter four-necked flask equipped with a stirrer, thermometer and column and 0.01 wt. % DBTL, relative to the initially introduced quantity of diol(s), were added. The mixture was heated to 80° C. HDI or a HDI/DCMDI mixture was then apportioned and a temperature was maintained so that the hot reaction mixture did not solidify. The reaction mixture was stirred until no free isocyanate could be detected (NCO content<0.1%). Thereafter the stoichiometric amount of an acid anhydride was apportioned and a temperature was maintained so that the hot reaction mixture did not solidify. The reaction was performed until the theoretical acid number was reached.

Examples 2a to 2e

Preparation of Tin-Containing Polyurethane Resins

The polyurethane dicarboxylic acids 1a to 1e were reacted with DBTO (dibutyltin oxide) in accordance with the following general synthesis method:

75 pbw (parts by weight) of the polyurethane dicarboxylic acids 1a to 1e were mixed with 3 pbw of DBTO and 22 pbw of xylene. The mixture was heated to 100 to 140° C. (depending on the melting properties of 1a to 1e) and homogenized. The temperature was raised to 160° C. and the formed water was separated from the mixture by aceotropic distillation.

After the theoretical amount of water was separated the xylene was distilled off under vacuum. The solvent-free resin melt was discharged and allowed to cool and solidify.

The melting behavior of the resultant tin-containing polyurethane resins was investigated by means of DSC (differential scanning calorimetry, heating rate 10 K/min).

Examples 2a to 2e are shown in Table 1. The Table states which reactants were reacted together in what molar ratios and the final temperature of the melting process measured by DSC is stated in ° C.

TABLE 1

| Ex. | Mols HDI | Mols HSA | Mols diol A | Mols Diol B | Mols Anhydride | Tin content (wt.-%) | FT |
|---|---|---|---|---|---|---|---|
| 2a | 2 | 2 | 1 EG | | | 1.8 | 80° C. |
| 2b | 2 | 2 | 1 HEX | | | 1.8 | 87° C. |
| 2c | 2 | 2 | 1 PROP | | | 1.8 | 79° C. |
| 2d | 2 | | 1 HEX | 2 PENT | 2 HHPA | 1.8 | 107° C. |
| 2e | 2 | | 3 PENT | | 2 SA | 1.8 | 124° C. |

FT; final temperature of the melting process
EG: ethylene glycol
HEX: 1,6-hexanediol
PENT: 1,5-pentanediol
PROP: 1,3-propanediol
HHPA: hexahydrophthalic anhydride
SA: succinic anhydride Example 3

Preparation of an Uncatalyzed Two-Component Clear Coat Composition

The following components were mixed to form a clear coat base: 70 pbw of a solution of a hydroxyl-functional methacrylic binder resin in a 34 pbw:4 pbw mixture of Solvesso® 100 and n-butanol (solids content 62 wt.-%; copolymer of 1 pbw of acrylic acid, 6.1 pbw of butyl acrylate, 5 pbw of hydroxypropyl methacrylate, 5 pbw of isobutyl methacrylate, 7.5 pbw of hydroxyethyl acrylate, 10 pbw of styrene, 10 pbw of t-butyl methacrylate, 16.6 pbw of butyl methacrylate),
18 pbw Solvesso® 100,
12 pbw butyl acetate.

The clear coat base was mixed with Desmodur® N3390 (polyisocyanate crosslinker) in a stoichiometric ratio OH/NCO=1:1 prior to application of the two-component clear coat composition so formed.

Example 4

Preparation of a Clear Coat Composition Containing an Organotin Catalyst

Example 3 was repeated and 0.05 pbw of DBTL were mixed into 100 pbw of the two-component clear coat composition.

Example 5

Preparation of a Clear Coat Composition Containing a Latent Organotin Catalyst

The latent organotin catalyst 2a (tin-containing polyurethane resin 2a) was comminuted, ground and sieved by means of grinding and sieving methods conventional for the production of powder coatings and, in this manner, converted into a powder with an average particle size of 50 µm (determined by means of laser diffraction).

0.5 pbw of the pulverized latent organotin catalyst 2a was mixed into 100 pbw of the two-component clear coat composition of Example 3.

The pot life at 23° C. of the two-component clear coat compositions of Examples 3 to 5 was tested. The clear coat compositions were also applied onto glass plates by means of a doctor blade (doctor blade 9), flashed off for 10 minutes and then baked for 20 minutes at 140° C.

Table 2 shows technological properties of the clear coat compositions.

TABLE 2

| Clear coat | Catalyst | Pot life at 23° C. | Coating appearance after baking | Koenig pendulum hardness of baked clear coat after 1 day aging (seconds) |
|---|---|---|---|---|
| 3 | ./. | 100% viscosity increase within 134 min after mixing | clear, glossy and tack-free film | 115 |
| 4 | DBTL *) | 100% viscosity increase within 58 min after mixing | clear, glossy and tack-free film | 151 |
| 5 | 2a *) | 100% viscosity increase within 125 min after mixing | clear, glossy and tack-free film | 150 |

*): corresponding to an amount of 0.009 wt.-% tin in the clear coat composition

What is claimed is:
1. A tin-containing polyurethane resin having a melting temperature of 40 to 180° C., measured by DSC at a heating rate of 10 K/min and prepared by carrying out a condensation reaction between a diorganotin compound and carboxyl groups of a carboxyl-functional polyurethane resin, wherein the molar ratio between the tin and the carboxyl groups is 1:2-20, wherein the diorganotin compound is selected from the group consisting of diorganotin oxides and diorganotin dialkanoates, and wherein the carboxyl-functional polyurethane resin is selected from the group consisting of polyurethane dicarboxylic acids and polyurethane monocarboxylic acids.

2. The tin-containing polyurethane resin of claim 1, wherein the melting temperature is from 40 to 150° C.

3. The tin-containing polyurethane resin of claim 1 having a solubility of less than 10 g per liter of butyl acetate or water at 20° C.

4. The tin-containing polyurethane resin of claim 1 having a tin content of 0.5 to 8 wt.-%, calculated as elemental tin metal.

5. A liquid coating composition which contains a binder A and, as an optional component, a crosslinker B for the binder A, and solid particles of the tin-containing polyurethane resin of claim 1.

6. The coating composition of claim 5 containing water and/or organic solvent(s) and having a solids content of 35 to 75 wt.-%, wherein the solids content consists of the resin solids content, the solid particles of the tin-containing polyurethane resin and the optional components chosen from the following: pigments, fillers and non-volatile additives.

7. The coating composition of claim 5 or 6, wherein the average particle size of the solid particles of the tin-containing polyurethane resin is 1 to 100 µm.

8. The coating composition claim 5, wherein the solid particles of the tin-containing polyurethane resin are contained in a proportion of 0.5 to 10 wt.-%, relative to the resin solids of the coating composition.

9. The coating composition of claim 5, wherein the binder A is a hydroxyl-functional binder and wherein the crosslinker B is a free or blocked polyisocyanate crosslinker.

10. The coating composition of claim 5, wherein the solid particles of the tin-containing polyurethane resin are present as a catalyst, and wherein a catalyst component in the coating composition consists of the solid particles of the tin-containing polyurethane resin.

11. The tin-containing polyurethane resin of claim 1, wherein the diorganotin compound is a diorganotin oxide.

* * * * *